Patented Sept. 14, 1937

2,093,285

UNITED STATES PATENT OFFICE 2,093,285

PROCESS OF MAKING BRAN FOOD

Eugene H. McKay, Battle Creek, Mich., assignor to Kellogg Company, Battle Creek, Mich., a corporation of Delaware No Drawing. Application December 23, 1935, Serial No. 55,758

9 Claims. (Cl. 99—80)

This invention relates to a ready-to-eat cereal food made from bran and to the process for the manufacture of the same.

The bran foods high in fiber content now available on the market are in the form of shreds or lumps. These bran foods are made from raw bran and flavor cooked together, and subsequently formed and lightly toasted.

Now, it is well known that bran of high fiber content is unpalatable and contains certain bitter principles undesirable in a breakfast food. It is, however, used in the preparation of these shreds or lumps because of its high fiber content, which promotes laxation. These shreds or lumps are not as easy to chew nor as palatable as flaked cereals. Heretofore when attempts have been made to produce flakes from bran high in fiber content, small flakes and fine material resulted. Such a product treated with milk or cream lost its appetizing appeal as a cereal food. Furthermore, there is present the bitterness characteristic of bran products.

One of the objects of the invention is to provide ready-to-eat bran-containing cereal food products, possessing characteristics other than those inherent in the ready-to-eat cereals commonly sold which are usually made from cooked raw cereal, or cereal parts. New cereal foods, more palatable, easier to digest and with greater eye and taste appeal than those heretofore made, may, by means of the present invention, be made from bran or grain or parts of grain containing bran.

A further object of the invention is to provide a flaked bran food of larger flakes than any heretofore produced.

A further object of the invention is so to change the character of the bran during the process of manufacture that uniform flakes, high in fiber content, can be produced from the bran.

Another object is to eliminate the characteristic bitterness of the bran, and thus make it more palatable than bran foods heretofore known.

Other objects and advantages of the invention will appear from the following description of the process and the product produced thereby.

According to the process of the invention, the bran is disembittered, the residual starch and other carbohydrates are dextrinized, and a high fiber bran flake of high water-absorbing capacity, with special physiological merits, results.

It is well known that raw bran particles cooked together fail to adhere to one another, and for this reason it has been impossible in the past to make desirable bran flakes high in fiber content.

It has been discovered by me, as a result of investigation and experimentation, that when bran is roasted prior to the cooking operation the starch and residual carbohydrates are partially dextrinized. Furthermore, the bitter principles present in raw bran are destroyed. Dextrins have pronounced adherent qualities, and when the roasted bran is cooked the bran particles are caused to adhere together by the dextrins present. Several of the original bran particles combine to form a unit, from which a larger bran flake can be made, as distinguished from the very small bran flakes made by previous processes, where the bran is unroasted prior to cooking, and, thus lacking the dextrinization resulting from the present process, the cooked particles fail to adhere to one another.

The roasting process must be carefully controlled in order to obtain the correct degree of dextrinization. The bran should not be carbonized in the process of roasting. Thus the roasted bran may be manufactured into a delicious, palatable flake of large size, easy to chew, and largely free from the bitter principles found in bran foods available on the market.

The texture of the bran flakes thus produced is a great improvement over the bran cereals sold as shreds or lumps. The great pressures obtained in the flaking mills tend to rupture the fibers and to otherwise change the structure of the tissues in the bran. As a combined result of this effect together with the roasting and cooking steps of the process, a superior bran food is produced.

Furthermore, the effect of flavoring agents added to the bran is greatly enhanced, since the flavor is not partially neutralized by the bitter principles inherent in the raw bran.

The following example will illustrate the manner in which the invention may be put into practice.

The raw material may, for example, be wheat bran, especially selected to insure a uniform layer of adherent starch, but reasonably free from loose flour.

The bran is placed in a rotary roasting cylinder and heated by a gas flame so as to volatilize the moisture and partially dextrinize the starch adhering to the bran. The bran is held in the cylinder until the bran reaches a temperature of, say, approximately 310 degrees to 315 degrees F., as indicated by a thermometer held in the stream of bran rotating in the roaster. Care must be taken to control the roasting carefully to secure proper dextrinization without roasting the bran dark enough to produce an over-roasted flavor. The roasting generally requires a time of three to six minutes, depending upon the quantity of bran roasted and the temperature to which the bran is heated in the roaster. As soon as the bran reaches the desired temperature and light brown color, the bran is quickly removed from the roaster and immediately cooled in a blast of cold air on a perforated metal pan to avoid overheating.

The roasted bran, say one hundred pounds, is then transferred to a rotary steam cooker, where, for example, six gallons of a flavoring fluid containing ten pounds of sugar and two pounds of salt dissolved in water are added and the whole thoroughly mixed. The cooker is then rotated and steam admitted to the cooker under a pressure of about fifteen pounds per square inch. Cooking is continued for one hour, more or less, at the above pressure, or until a light, fluffy, well-cooked mass results.

During this cooking operation, the bran is thoroughly cooked, and the starch which was dextrinized by roasting is converted to a soluble dextrin adhesive, partially dissolved in water, so as to provide the adhesive paste necessary to cause adherence of the bran particles to one another. As a result, the bran particles are caused to adhere together to form aggregated masses or units, each mass or unit consisting of a number of bran particles.

The cooked bran is then preferably transferred to a drying vat where it is partially dried with frequent stirring in a blast of warm air, that is, to a moisture content of about twenty per cent. The bran is then removed from the vat and desirably tempered for a suitable time, say eighteen hours, an air-tight tempering bin preferably being employed.

After tempering, the bran is preferably subjected to the penetrative action of steam to soften the fibers of the bran and render these fibers more readily disintegrated in the subsequent flaking process.

The dextrin adhesive also absorbs some of the moisture from the steam and is thoroughly heated to secure the desired adhesion of bran particles during the subsequent rolling operation. The hot, steaming bran is then fed in a fine uniform stream between heavy rotary flaking mills, where the bran units or masses are pressed into thin flakes, each composed of several individual bran particles caused to adhere together by the dextrinized starch adhesive formed in the roasting and cooking operations. These flakes are really aggregates of larger size than the original bran flakes and are of a soft, delicate texture.

The broad flakes of cooked bran are then delivered at a uniform rate into a rotary solid-drum toasting oven, where they are heated by air at a temperature of about 500 degrees F. until the flakes are uniformly crisp and brown. The crisp flakes flow at a uniform rate from the toasting oven and are conveyed to the packing room ready for packaging.

By the means of the process of the invention, bran flakes are made having a fiber content of from 7.7% to 9.2%, depending upon the fiber content of the particular lot of bran used as the starting material. As contrasted with this, it has been impossible with the prior processes to make a satisfactorily flaked bran product having a fiber content above 6%.

The fiber content of a ready-to-eat bran food is a direct measure of the laxative value of the product. One of the primary functions of bran products in increasing laxation is to carry a greater quantity of moisture into the intestinal tract, so that a product having greater water-absorbing power has greater laxative value. Tests have shown that the product of the present invention has greater water- or milk-absorbing power than other forms of ready-to-eat bran foods.

From the foregoing it is evident that by the present process bran flakes are made with a 30% to 50% higher fiber content than prior art bran flakes; that the flakes may be made of larger size; that the higher fiber content of the flakes gives greater laxative properties to the product than occurs with prior art bran flakes, and that the bran flakes of the invention have greater water-absorbing power than other forms of ready-to-eat bran food. Moreover, it is possible to manufacture bran flakes of a palatable quality, and of a size not obtainable by prior methods. This is due to the fact that the starch and/or residual carbohydrates are dextrinized in the process of roasting, prior to cooking, and the dextrins thus formed cause the bran particles to adhere to one another, producing larger masses for rolling, and, in consequence, larger flakes than have heretofore been obtainable; and due also to the roasting the bran is disembittered.

The texture of the bran flakes is also improved by virtue of the roasting step prior to the cooking and rolling steps. The great pressures obtained in the flaking mills tend to rupture the fiber and otherwise to change the structure of the tissues of the bran. As a result of the operations the flakes are more friable and more readily masticated than prior ready-to-eat bran foods, whether in flaked or other form.

Furthermore, the effect of the flavoring agents added to the food product is enhanced by the invention due to the disembittering of the bran by the roasting step.

I claim:

1. A process for making a ready-to-eat cereal food, comprising roasting bran substantially free from loose flour to partially dextrinize the starch, thereafter cooking the bran in moisture during which the dextrinized starch is converted into a soluble dextrin adhesive to cause adherence of bran particles to form aggregated masses, and rolling the aggregated masses to form flakes.

2. A process for making a ready-to-eat cereal food, comprising roasting bran substantially free from loose flour sufficiently to partially dextrinize the starch thereof, thereafter cooking the bran in moisture whereby the dextrinized starch is converted into a soluble dextrin adhesive to cause the bran particles to form themselves in aggregated masses, drying the masses to about 20% moisture content, tempering the same and rolling the unit masses of bran into flakes.

3. A process for making a ready-to-eat bran food, comprising roasting bran substantially free from loose flour to partially dextrinize the adhering starch, cooking the roasted bran in moisture until the dextrinized starch is converted to a soluble dextrin adhesive to cause the bran particles to form into unit masses of a number of adhering particles, thereafter forming the masses of adhering bran particles into flakes, and toasting the flakes.

4. A process for making a ready-to-eat bran food, comprising roasting bran substantially free from loose flour to partially dextrinize the adhering starch, cooking the roasted bran in moisture until the dextrinized starch is converted to a soluble dextrin adhesive to cause the bran particles to form into unit masses of a number of adhering particles, partially drying the unit masses, forming the masses into flakes, and toasting the flakes.

5. A process for making a ready-to-eat bran food, comprising roasting bran substantially free from loose flour to partially dextrinize the adhering starch but not sufficiently to produce a bitter flavor, cooking the roasted bran in moisture until it becomes light and fluffy and the dextrinized starch is converted to a soluble dextrin adhesive to cause the bran particles to form into unit masses of a number of adhering particles of bran, partially drying the cooked bran, rolling the masses into flakes, and toasting the flakes.

6. A process for making a ready-to-eat bran food comprising roasting bran substantially free from loose flour for from about three to six minutes at a temperature of about 310 to 31⁻ degrees F., cooking the roasted bran in moisture until the dextrinized starch due to the roasting is converted to a soluble dextrin adhesive causing the bran particles to agglomerate into unit masses of adhering particles, partially drying the masses, rolling the same, and toasting the rolled masses.

7. A process for making a ready-to-eat bran food comprising roasting bran substantially free from loose flour for from about three to six minutes at a temperature of about 310 to 315 degrees F., cooking the roasted bran in moisture until it becomes light and fluffy and the dextrinized starch due to the roasting is converted to a soluble dextrin adhesive causing the bran particles to agglomerate into unit masses of adhering particles, partially drying the said masses, tempering the same, rolling the masses into flakes and toasting the flakes.

8. A process for making a ready-to-eat bran food comprising roasting bran substantially free from loose flour until the adhering starch becomes partially dextrinized, but not sufficiently to produce a bitter flavor in the bran or to carbonize it, cooking the roasted bran in moisture and in flavoring and until the partially dextrinized starch is converted into a soluble dextrin adhesive to cause the particles of bran to adhere and form into unit masses, drying the units to about 20% moisture content, tempering the same, subjecting the units to the penetrative action of steam to soften the fibers of the bran, rolling the units while hot and steaming into flakes and toasting the flakes.

9. A process for making a ready-to-eat bran food comprising roasting bran substantially free from loose flour for from about three to six minutes to a light brown color at a temperature of from about 310 to 315 degrees F. or until the adhering starch becomes partially dextrinized but not sufficiently to produce a bitter flavor in the bran, then immediately cooling the bran, thereafter cooking the roasted bran in moisture and in flavoring until a light, fluffy, well cooked mass results, and the dextrinized starch is converted into a soluble dextrin adhesive to cause the particles of bran to adhere and form into unit masses, drying the units to about 20% moisture content, tempering the same, subjecting the units to the penetrative action of steam to soften the fibers of the bran and render the same more readily disintegrated in the subsequent flaking operation, rolling the units while hot and steaming into flakes and toasting the flakes.

EUGENE H. McKAY.